(12) United States Patent
Tazawa et al.

(10) Patent No.: US 7,889,988 B2
(45) Date of Patent: Feb. 15, 2011

(54) OPTICAL TRANSMISSION APPARATUS

(75) Inventors: Hideaki Tazawa, Kawasaki (JP); Tsuyoshi Ohigawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 918 days.

(21) Appl. No.: 11/501,760

(22) Filed: Aug. 10, 2006

(65) Prior Publication Data

US 2007/0072451 A1 Mar. 29, 2007

(30) Foreign Application Priority Data

Sep. 28, 2005 (JP) ............................. 2005-282095

(51) Int. Cl.
*H04B 10/08* (2006.01)
(52) U.S. Cl. ................. 398/9; 398/16; 398/22; 398/25; 398/139; 398/164
(58) Field of Classification Search ............... 398/9–33, 398/135–139
See application file for complete search history.

(56) References Cited

U.S. PATENT DOCUMENTS 6,480,751 B1 * 11/2002 Kuribayashi et al. .......... 700/56

| 2002/0046048 | A1 * | 4/2002 | Fukushima et al. | ............ 705/1 |
|---|---|---|---|---|
| 2004/0091028 | A1 * | 5/2004 | Aronson et al. | ............. 375/219 |
| 2004/0136719 | A1 * | 7/2004 | Hidai et al. | ................. 398/135 |
| 2004/0228627 | A1 * | 11/2004 | Alana et al. | .................... 398/9 |
| 2005/0203504 | A1 * | 9/2005 | Wham et al. | .................. 606/34 |
| 2006/0095222 | A1 * | 5/2006 | Reintjes et al. | ............. 702/106 |

FOREIGN PATENT DOCUMENTS

JP 10-156022 6/1998

* cited by examiner

*Primary Examiner*—Li Liu
(74) *Attorney, Agent, or Firm*—Staas & Halsey LLP

(57) ABSTRACT

An optical transmission apparatus to which an optical module having optical module information stored therein is attachable, the optical module information being manufacturing information about the optical module, includes a certification rank table configured to a list, with respect to each of a plurality of optical modules, the optical module information regarding an optical module and a rank indicative of a range of guarantee for the corresponding optical module, and a ranking unit configured to refer to the certification rank table by use of the optical module information stored in an optical module attached to the optical transmission apparatus so as to determine the rank indicative of a range of guarantee for the attached optical module, wherein the determined rank is reported to an exterior of the apparatus.

5 Claims, 7 Drawing Sheets

FIG.3

| Transceiver code | Vender ID | Vender Parts Number | Vender Revision | Rank |
|---|---|---|---|---|
| OC-48 | A COMPANY | Fxna-0024 | Rev.01 | Rank2 |
| OC-48 | A COMPANY | Fxna-0024 | Rev.02 | Rank1 |
| ... | | | | |
| OC-48 | B COMPANY | Nrw-xa006 | Rev.01 | Rank3 |
| OC-12 | B COMPANY | Nrw-xa004 | Rev.01 | Rank2 |
| OC-12 | A COMPANY | Fxna-0015 | Rev.05 | Rank1 |
| ... | | | | |
| OC-12 | C COMPANY | HE-0a85 | Rev.03 | Rank3 |
| OC-3 | A COMPANY | Fxna-0002 | Rev.02 | Rank1 |
| OC-3 | E COMPANY | Ekx-sa5 | Rev.07 | Rank1 |
| OC-3 | E COMPANY | Ekx-sa5 | Rev.06 | Rank3 |
| ... | | | | |
| OC-3 | C COMPANY | HE-0a55 | Rev.02 | Rank4 |

OPTICAL TRANSMISSION APPARATUS

BACKGROUND OF THE INVENTION

1. Field of the Invention

The present invention generally relates to optical transmission apparatuses, and particularly relates to an optical transmission apparatus using an optical module that is pluggable to the optical transmission apparatus.

2. Description of the Related Art

Optical transceivers (optical modules) used in optical transmission apparatuses provided for backbone networks as typified by SONET, SDH, WDM, etc., are developed by makers and manufacturers using their own designs and interfaces, and thus do not possess universal applicability. Against this background, the MSA (Multi-Source Agreement) has been established as an industry standard for the optical module industry for the purpose of achieving cost advantage and revitalizing the optical module industry. This has resulted in the spread of optical modules having universal applicability based on standardized design and interface. Among such standardized optical modules (MSA modules), those with pluggable structure such as SFP (Small Form Factor Pluggable) and XFP (10 Gigabit Small Form Factor Pluggable) have been becoming mainstream.

As the market penetration of such pluggable modules is made, communication carriers who utilize optical transmission apparatuses to provide services are now demanding the use of optical modules purchased through their own purchase channels for the benefit of cost advantage, and are also demanding the reduction of repair cost by making it possible to replace only a pluggable module upon failure. Because of this, the optical transmission apparatuses employing standardized pluggable optical modules are now required to have such a structure as to allow optical modules to be freely replaced.

When pluggable optical modules are employed for optical transmission modules, the main issue is how to keep balance between the reliability of the apparatuses and the convenience of the pluggable optical modules (high availability, easy maintenance, low cost, and so on). In the following, three examples of the related-art usage of a pluggable optical module will be described.

FIG. 1A is a drawing showing a first usage type. A pluggable optical module 1 is fixedly mounted in an optical transmission apparatus 2. In this configuration, only those which have passed the test by the manufacturers at the time of shipment from factory are mounted. This can avoid use of poor-quality products, thereby making it possible to ensure the reliability of the apparatuses.

FIG. 1B is a drawing showing a second usage type. A pluggable optical module 3 is freely pluggable to an optical transmission apparatus 4, which provides for easy maintenance at the time of failure or the like. Also, clients can make their own choice to select inexpensive optical modules, so that the manufacturers can provide cost advantage to the clients.

FIG. 1C is a drawing showing a third usage type. A pluggable optical module 5 has such a structure as to be pluggable to an optical transmission apparatus 6. A CPU 7 of the optical transmission apparatus 6 checks the optical module by comparing the module code read from the optical module 5 via a DDM (Digital Diagnostics Monitor) interface 8 with the module code of an operable optical module stored in a memory 9. If a module having a wrong code is mounted, an alarm is issued to a monitoring control apparatus so as to prevent the use of the optical module 5.

Patent Document 1 discloses transmitting a membership number read from a membership card by a hall-installed apparatus to a management computer, which reads a membership classification flag stored in memory in response to the membership number for transmission to the hall-installed apparatus, so that the hall-installed apparatus displays the membership class of the member as indicated by the membership classification flag.

Patent Document 1 Japanese Patent Application Publication No. 10-156022

The first usage type cannot make use of the convenience of a pluggable optical module such as the fact that it is pluggable, and, also, cannot allow a client to use an optical module that the client obtained through his/her own channel.

The second usage type raises concern that a pluggable optical module not suitable to the apparatus or a poor-quality module may be used. In the worst case, there is a possibility of having a situation in which the communication channel fails while it is used. That is, the reliability of the apparatus may not be guaranteed.

The third usage type allows only exactly the same product as specified by the manufacture to be used when replacing the pluggable optical module 5 upon failure of the pluggable optical module 5, and does not allow the use of a pluggable optical module having the same characteristics if it is not the type as specified. Further, it is not possible for a client (communication carrier) using the apparatus to make its own choice to select an inexpensive pluggable optical module. That is, no cost merit is provided to clients.

Further, if an inexpensive pluggable optical module that is not fully supported by the manufacture is chosen, there is a need to check, before putting this pluggable optical module into operation, whether this module properly operates in the optical transmission apparatus and whether this module has sufficient characteristics for operation of the communication channel. A test that is currently conducted by the manufacturers for the purpose of checking a pluggable optical module for certification is performed by assuming the worst conditions (in terms of ambient temperature, transmission distance, etc.) in which the pluggable optical module is operated. Only those which passed this rigorous test are certified. This is the same when a client makes its own choice to select a pluggable optical module. That is, there are needs to determine product specifications by assuming the worst conditions for operation, to prepare a dedicated measurement device to conduct an optical-characteristic test, a transmission test, etc, and to actually perform various test items. In this manner, a large number of process steps are required in order to select a pluggable optical module.

In reality, however, the conditions of use, transmission distance, etc., differ from communication line to communication line, and not all the optical modules are used in the worst conditions. Conducting tests by determining product specifications based on the worst conditions serves to narrow the range of choices of an pluggable optical module to be used. Further, a large number of optical module venders rigorously develop and update new pluggable optical modules to sell inexpensive optical modules. Against this background, the reduction of a number of process steps for product certification is an important issue.

Accordingly, there is a need for an optical transmission apparatus that can clearly specify the range of product guarantee while offering ease of maintenance and cost advantage, and that can widen the range of choices of pluggable optical modules to be used.

SUMMARY OF THE INVENTION

It is a general object of the present invention to provide an optical transmission apparatus that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an optical transmission apparatus particularly pointed out in the specification in such full, clear, concise, and exact terms as to enable a person having ordinary skill in the art to practice the invention.

To achieve these and other advantages in accordance with the purpose of the invention, the invention provides an optical transmission apparatus to which an optical module having optical module information stored therein is attachable, the optical module information being manufacturing information about the optical module, includes a certification rank table configured to a list, with respect to each of a plurality of optical modules, the optical module information regarding an optical module and a rank indicative of a range of guarantee for the corresponding optical module, and a ranking unit configured to refer to the certification rank table by use of the optical module information stored in an optical module attached to the optical transmission apparatus so as to determine the rank indicative of a range of guarantee for the attached optical module, wherein the determined rank is reported to an exterior of the apparatus.

According to at least one embodiment of the present invention, the optical transmission apparatus can clearly define the range of product guarantee while providing ease of maintenance and cost advantage, and can widen the range of choices of pluggable optical modules to be used.

BRIEF DESCRIPTION OF THE DRAWINGS

Other objects and further features of the present invention will be apparent from the following detailed description when read in conjunction with the accompanying drawings, in which:

FIG. 3 is a drawing showing a certification rank table;

DESCRIPTION OF THE PREFERRED EMBODIMENTS

In the following, embodiments of the present invention will be described with reference to the accompanying drawings.

<Network Configuration>

Figure 1A:
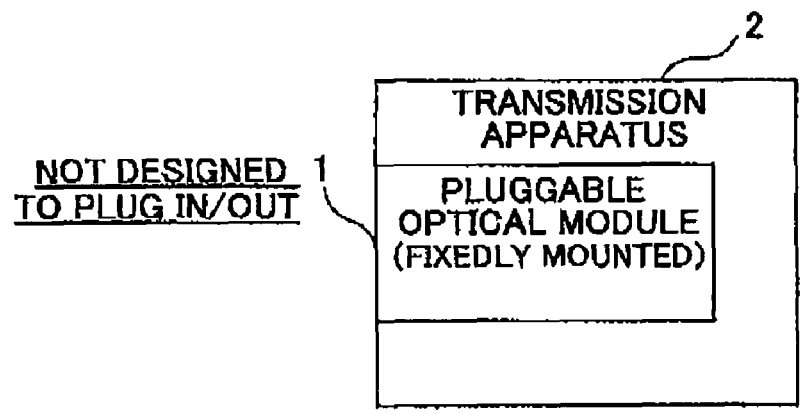
FIGS. 1A through 1C are drawings showing the usage types of a related-art pluggable optical module.
Figure 1B:
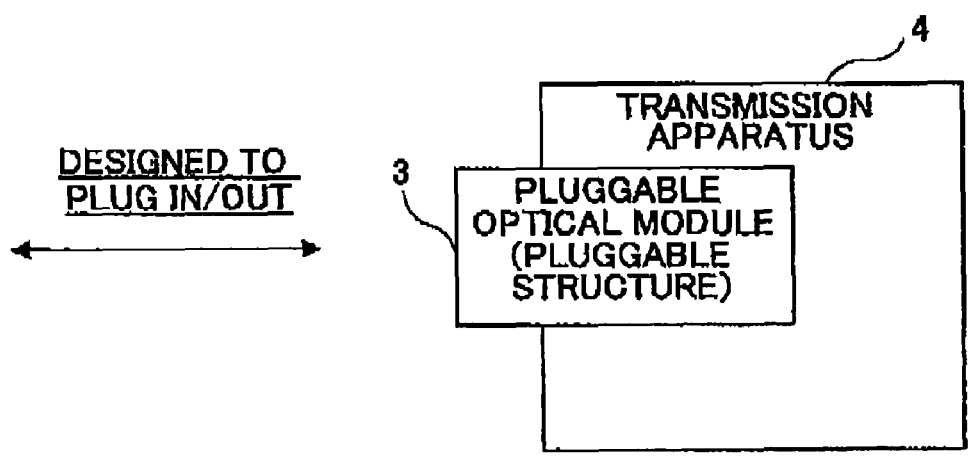
Figure 1C:
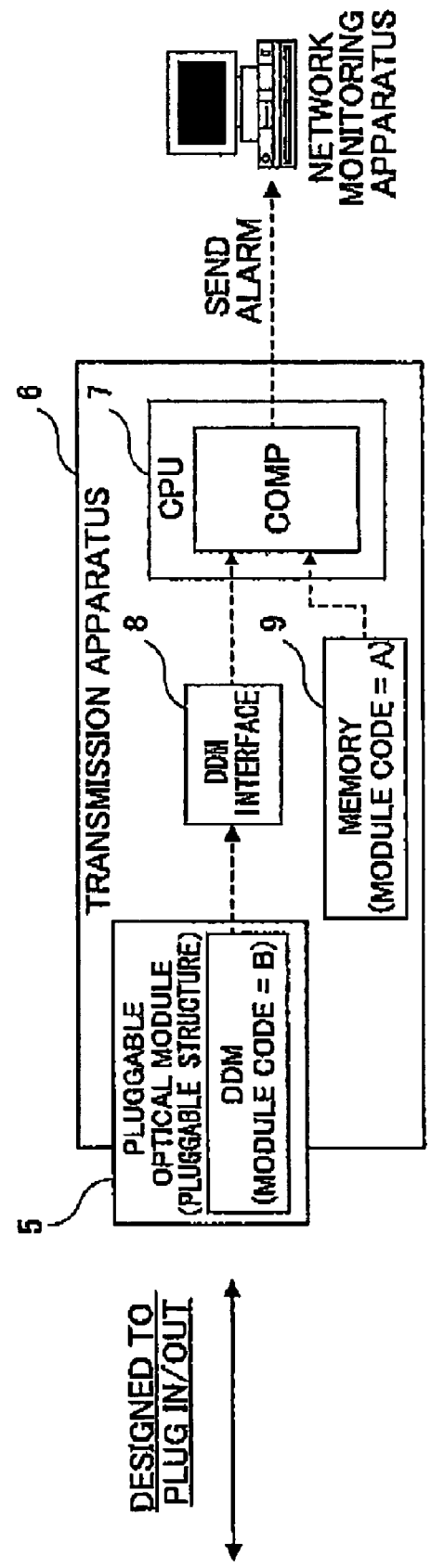
Figure 2:
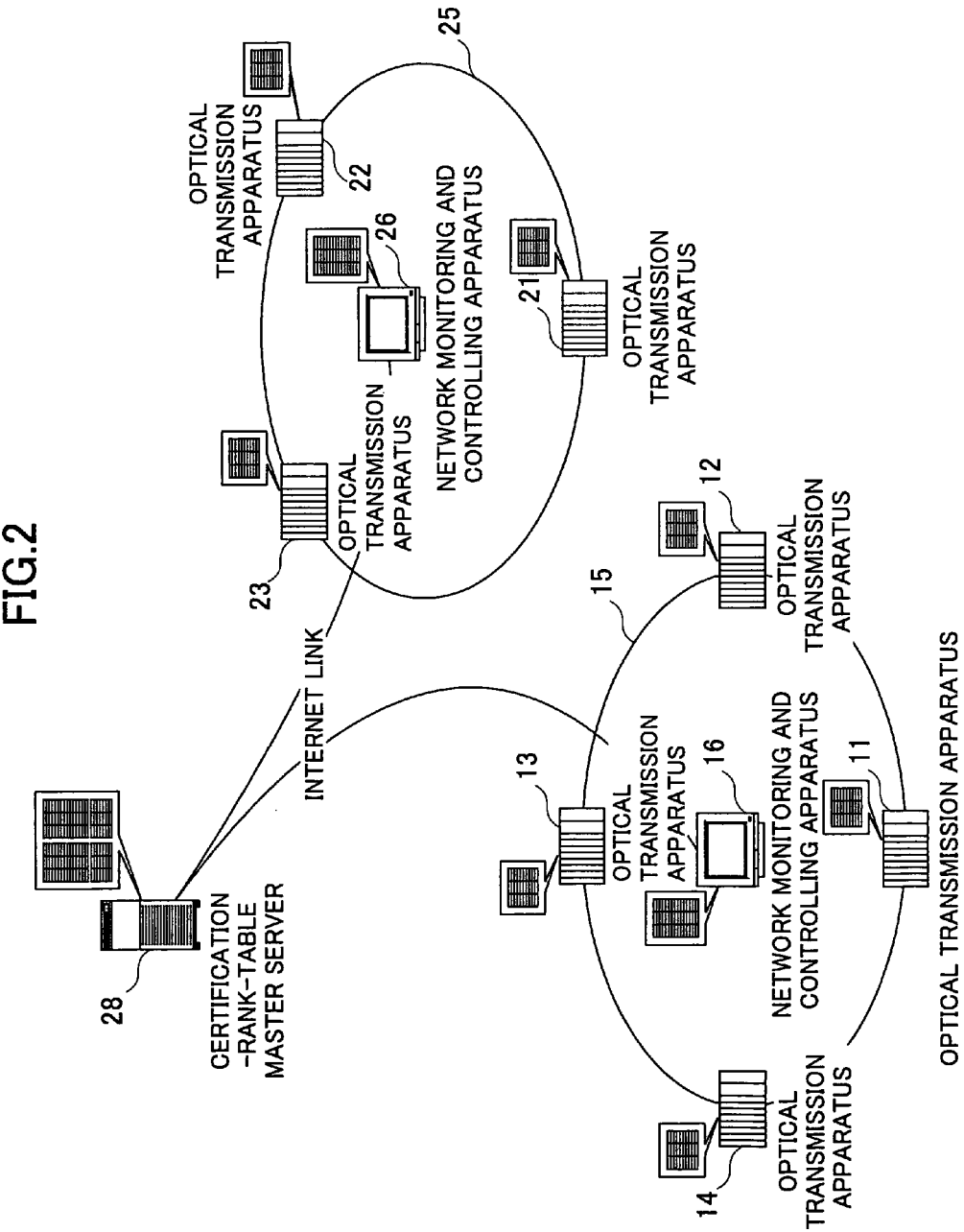
FIG. 2 is a drawing showing the configuration of an embodiment of a network system that is constructed by use of an optical transmission apparatus of the present invention.

FIG. 2 is a drawing showing the configuration of an embodiment of a network system that is constructed by use of an optical transmission apparatus of the present invention. In FIG. 2, optical transmission apparatuses 11, 12, 13, and 14 constitute a network 15. A network monitoring and controlling apparatus 16 monitors the operation states of the apparatuses and the performance of channels between the apparatuses so as to control the apparatuses according to the situations.

By the same token, optical transmission apparatuses 21, 22, and 23 constitute a network 25, which is operated by a network monitoring and controlling apparatus 26, Each of the optical transmission apparatuses and network monitoring and controlling apparatuses has a certification rank table that lists the certification ranks of pluggable optical modules such as SFP modules. Each of the network monitoring and controlling apparatuses 16 and 26 is connectable via the Internet to a certification-rank-table master server 28 provided at a optical transmission apparatus maker.

<Certification Rank Table>

As shown in FIG. 3, each certification rank table includes the name of usage (Transceiver code) as defined by the MSA standard, the name of a pluggable optical module vender (Vender ID), the name of a pluggable optical module type (Vender Parts Number) as defined by the pluggable optical module vender, the version number of the pluggable optical module (Vender Revision), and rank 1, 2, 3, or 4 as defined by the apparatus maker according to its own ranking standard. These items are associated with each other in the table. The ranking is provided according to the apparatus maker's own standard based on the data accumulated over the years regarding the results of certification tests and experienced failures. Each rank is intended to mean the following.

Rank 1: A product having this rank is fully guaranteed by the apparatus maker in terms of its operation and characteristics (i.e., certified apparatus).

Rank 2: A product having this rank is guaranteed by the apparatus maker in terms of its operation only (i.e., certified apparatus with some limitation to its ability).

Rank 3: A product having this rank has not been subjected to a certification test by the apparatus maker, but can be put into operation according to the user's decision since the code read from the optical module suggests that its operation is proper.

Rank 4: A product having this rank has failed the certification test conducted by the apparatus maker, or has been determined as not operable based on the memory code and thus cannot be used.

The certification rank table may contain different data amount depending on the positions where the server and apparatuses are situated. This is because the higher the frequency of uses of an optical module in the network is, or the higher the risk of failure of an optical module is, the closer its data is to the optical transmission apparatus. This is intended to reduce the time required for a certification process, which will later be described, and also to take into account the limitation of the table capacity that can be stored in the apparatus.

Moreover, there is a need to keep the certification rank table up to date everyday while hundreds of, thousands of optical module venders in the word are developing and updating new pluggable optical modules everyday. In order to keep the certification rank table of each optical transmission apparatus up to date, the network monitoring and controlling apparatuses 16 and 26 access the certification-rank-table master server 28 at constant intervals, and download the latest ranking data of the pluggable optical modules currently used in their respective local networks or of the pluggable optical modules likely to be used in the future, thereby keeping the certification rank tables in the network monitoring and controlling apparatuses 16 and 26 up to date. Further, if data of the most importance optical modules such as one that could create disastrous consequences is registered in the master server, the certification-rank-table master server 28 initiates a contact to prompt the network monitoring and controlling apparatuses 16 and 26 to update the table data.

Further, the network monitoring and controlling apparatuses 16 and 26 transmits to each transmission apparatus only the certification rank data that is specialized to the pluggable optical modules currently used in their respective local networks and/or the pluggable optical modules highly likely to be used in the future. The updating of the rank table in each transmission apparatus is performed in this manner so as to achieve a high speed certification process and the reduction of table capacity.

<Configuration of Pluggable Optical Module and Optical Transmission Apparatus>

Figure 4:
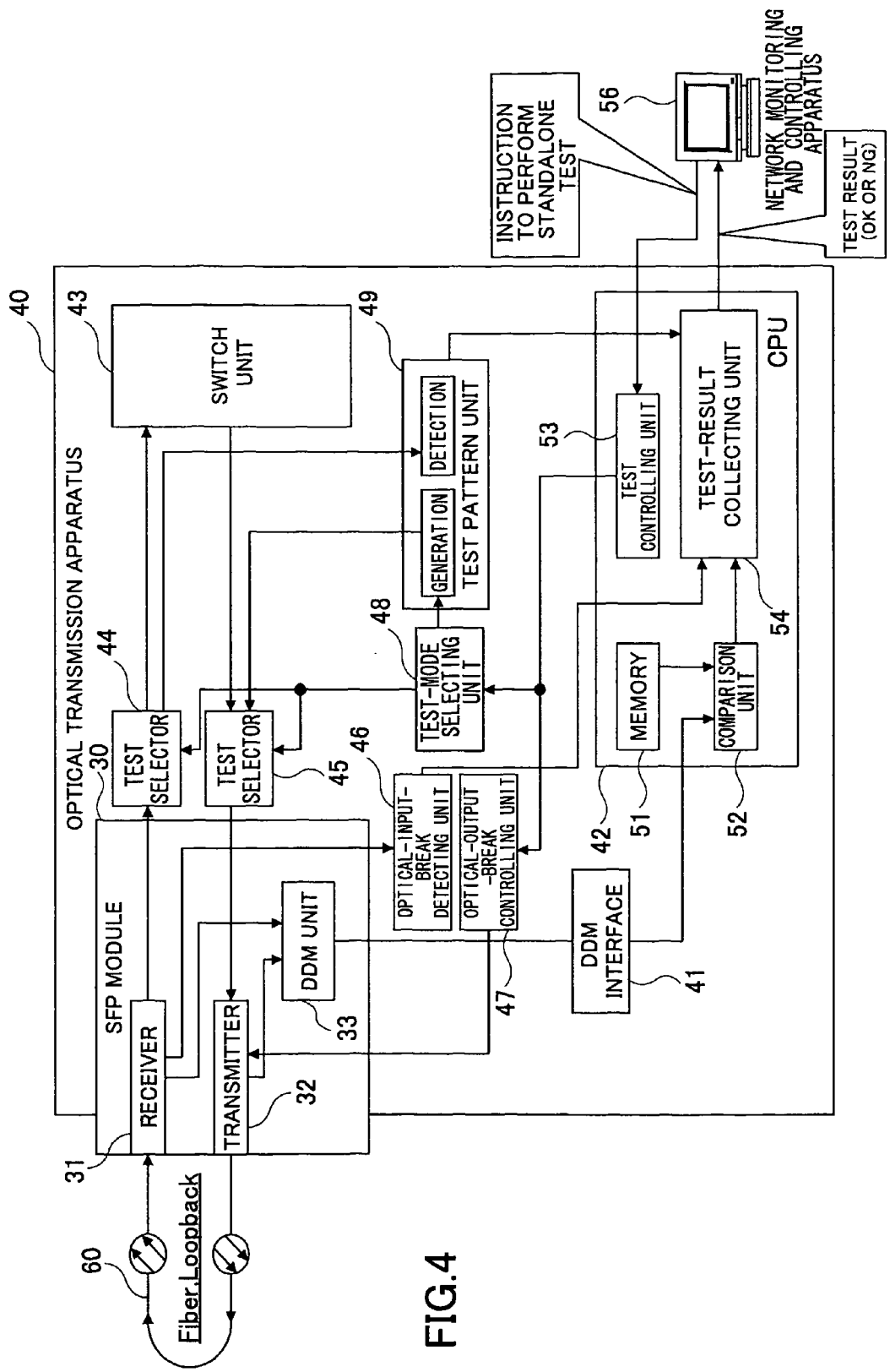
FIG. 4 is a drawing showing the configuration of an embodiment of a pluggable optical module and optical transmission apparatus.

FIG. 4 is a drawing showing the configuration of an embodiment of a pluggable optical module and optical transmission apparatus. In FIG. 4, a pluggable optical module 30 such as an SFP module is mounted in an optical transmission apparatus 40. The pluggable optical module 30 includes a receiver 31 for receiving optical signals, a transmitter 32 for transmitting optical signals, and a DDM unit 33 for storing therein optical module information such as manufacturing information about the optical module including the name of usage, the name of the pluggable optical module vender, the name of the pluggable optical module type, and the version number of the pluggable optical module.

The optical transmission apparatus 40 includes a DDM interface 41, a CPU 42 for controlling the entirety of the apparatus, a switch unit 43 for providing cross-connects, test selectors 44 and 45 situated between the pluggable optical module 30 and the switch unit 43, an optical-input-break detecting unit 46 for detecting a break of an optical input at the receiver 31, an optical-output-break controlling unit 47 for controlling a break of an optical output at the transmitter 32, a test-mode selecting unit 48 for selecting a test mode, and a test pattern unit 49 for generating and detecting a test pattern.

The CPU 42 includes a memory 51 for storing software, a certification rank table, and various standard values, a comparison unit 52, a test controlling unit 53, and a test-result collecting unit 54.

<Operation of Optical Transmission Apparatus upon Implementation>

Figure 5:
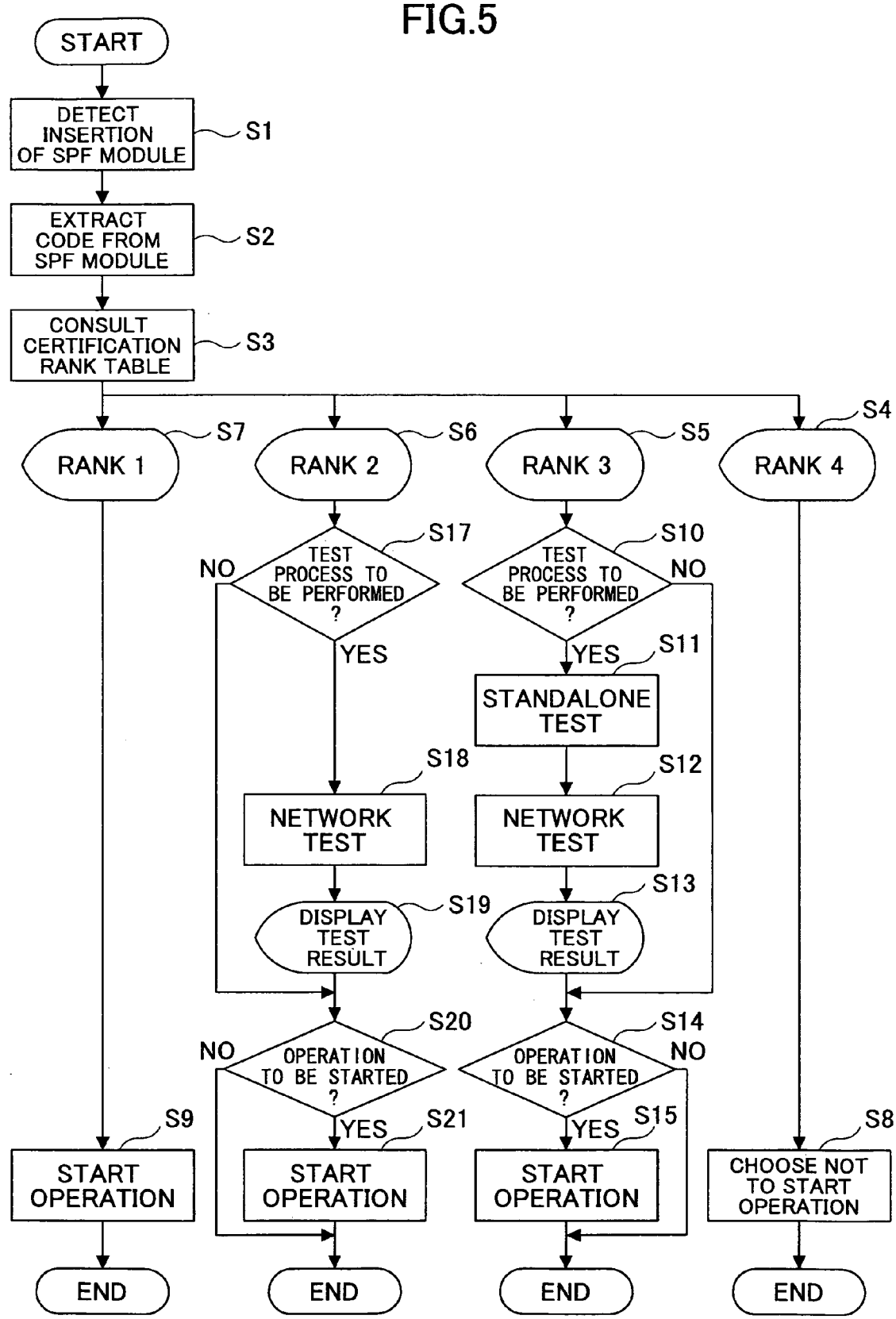
FIG. 5 is a flowchart of a process performed by the optical transmission apparatus to which the pluggable optical module is mounted.

FIG. 5 is a flowchart of a process performed by the optical transmission apparatus to which the pluggable optical module is mounted.

At step S1, the CPU 42 detects the insertion of the pluggable optical module 30. At step S2, the CPU 42 reads the name of usage, the name of the pluggable optical module vender, the name of the pluggable optical module type, and the version number of the pluggable optical module from the DDM unit 33 of the pluggable optical module 30 via the DDM interface 41.

At step S3, a check is made as to whether the name of usage of the pluggable optical module 30 is the same as a usage name that conforms to the optical transmission apparatus 40. If the usage name does not match, the pluggable optical module 30 is determined as unusable. At step S4, the CPU 42 reports rank 4 to a network monitoring and controlling apparatus 56 for display of this rank. At step S8, the CPU 42 takes measures to prevent optical output and to stop the operation of the pluggable optical module 30.

If the usage names match, the name of the pluggable optical module vender, the name of the pluggable optical module type, and the version number of the pluggable optical module of the pluggable optical module 30 are compared by the comparison unit 52 with the name of the pluggable optical module vender, the name of the pluggable optical module type, and the version number of the pluggable optical module listed in the certification rank table of the optical transmission apparatus 40 stored in the memory 51. If the certification rank table contains a matched data item, the rank of this data item is displayed (steps S5 through S7).

If no matched data item is found, the certification rank table of the network monitoring and controlling apparatus of FIG. 2 is referred to. If no matched data item is found even in this certification rank table, an upper-order certification-rank master server is referred to. If no match is found even in this server, the module is determined as having a matching usage name but not certified. Rank 3 is reported to the network monitoring and controlling apparatus 56 for display of the rank.

If match is detected in the checking of any certification rank tables, the rank obtained as a result of the check is reported to the network monitoring and controlling apparatus 56 for display of the rank. A check as to whether the module is usable or unusable is made as described above, thereby performing a first-stage selection process.

If certification as rank 1 is obtained, this means that the apparatus maker guarantees the functions and characteristics. At step S9, thus, the apparatus is put into operation as usual. If determination as rank 4 is obtained, this means that the module cannot be used. At step S8, thus, a measure such as the measure to prevent signal outputting is performed.

If certification as rank 3 is obtained, a check is made at step S10 to determine whether a test process is to be performed. In this example, if a test of the pluggable optical module has been conducted, the test process is skipped. If such a test has not been conducted, a standalone test for determining whether the pluggable optical module properly operates is performed at step S11. At step S12, further, a network test is conducted. At step S13, the test results are reported to the network monitoring and controlling apparatus 56 for display of the test results. Thereafter, a check is made at step S14 to determine whether to start operation. If the operation is possible, the apparatus is put into operation at step S15.

If certification as rank 2 is obtained, a check is made at step S17 to determine whether a test process is to be performed. In this example, if a test of the pluggable optical module has been conducted, the test process is skipped. If such a test has not been conducted, a network test for determining whether the pluggable optical module properly operates is performed at step S18. Since the standalone operation is already checked by the maker in the case of rank 2, no standalone test is performed. At step S19, the test results are reported to the network monitoring and controlling apparatus 56 for display of the test results. Thereafter, a check is made at step S20 to determine whether to start operation. If the operation is possible, the apparatus is put into operation at step S21.

<Standalone Test>

A standalone test will now be described by referring to FIG. 4. A standalone test is performed by providing a loopback between the receiver 31 and transmitter 32 of the pluggable optical module 30 via an optical fiber 60, and includes a signal communication test, an optical-output-break test, and an optical-input-break detection test.

In response to the instruction to perform a standalone test from the network monitoring and controlling apparatus 56, the CPU 42 enters a signal communication test mode. In the signal communication test mode, under the control of the test controlling unit 53, the test selectors 44 and 45 are switched from the operating communication line to the test pattern line, and the test pattern unit 49 supplies a test pattern to the transmitter 32 of the pluggable optical module 30. The test pattern returning through the optical fiber 60 is supplied to the test pattern unit 49 via the receiver 31 of the pluggable optical module 30 and the test selector 44.

The results of test pattern detection are reported from the test pattern unit 49 to the CPU 42. In response, the system software of the CPU 42 reports "signal communication test NG" to the network monitoring and controlling apparatus 56 if an error is found in the test pattern. If no error is detected in the test pattern, the mode for optical-output-break functionality test and optical-input-break functionality test is entered.

In the mode for optical-output-break functionality test and optical-input-break functionality test, the optical-output-break controlling unit 47 performs optical-output-break control with respect to the transmitter 32 of the pluggable optical module 30, and the receiver 31 of the pluggable optical module 30 performs optical-input-break detection with respect to the output of the transmitter 32 via the loopback of the optical fiber 60. The results of the optical-input-break detection are reported to the CPU 42. The system software of the CPU 42 reports "optical-output-break-functionality/optical-input-break-detection-functionality NG" to the network monitoring and controlling apparatus 56 if the optical input break is not properly detected. The system software of the CPU 42 reports the "standalone test OK" to the network monitoring and controlling apparatus 56 if the optical input break is properly detected.

The standalone test conducted in the manner as described above makes it possible for the user (communication carrier) using the apparatus to check whether the pluggable optical module 30 (rank 3) having undergone no certification test by the apparatus maker properly operates in the optical transmission apparatus. This helps to significantly reduce the number of process steps required for test preparation and test operation.

<Communication Line Test>

Figure 6:
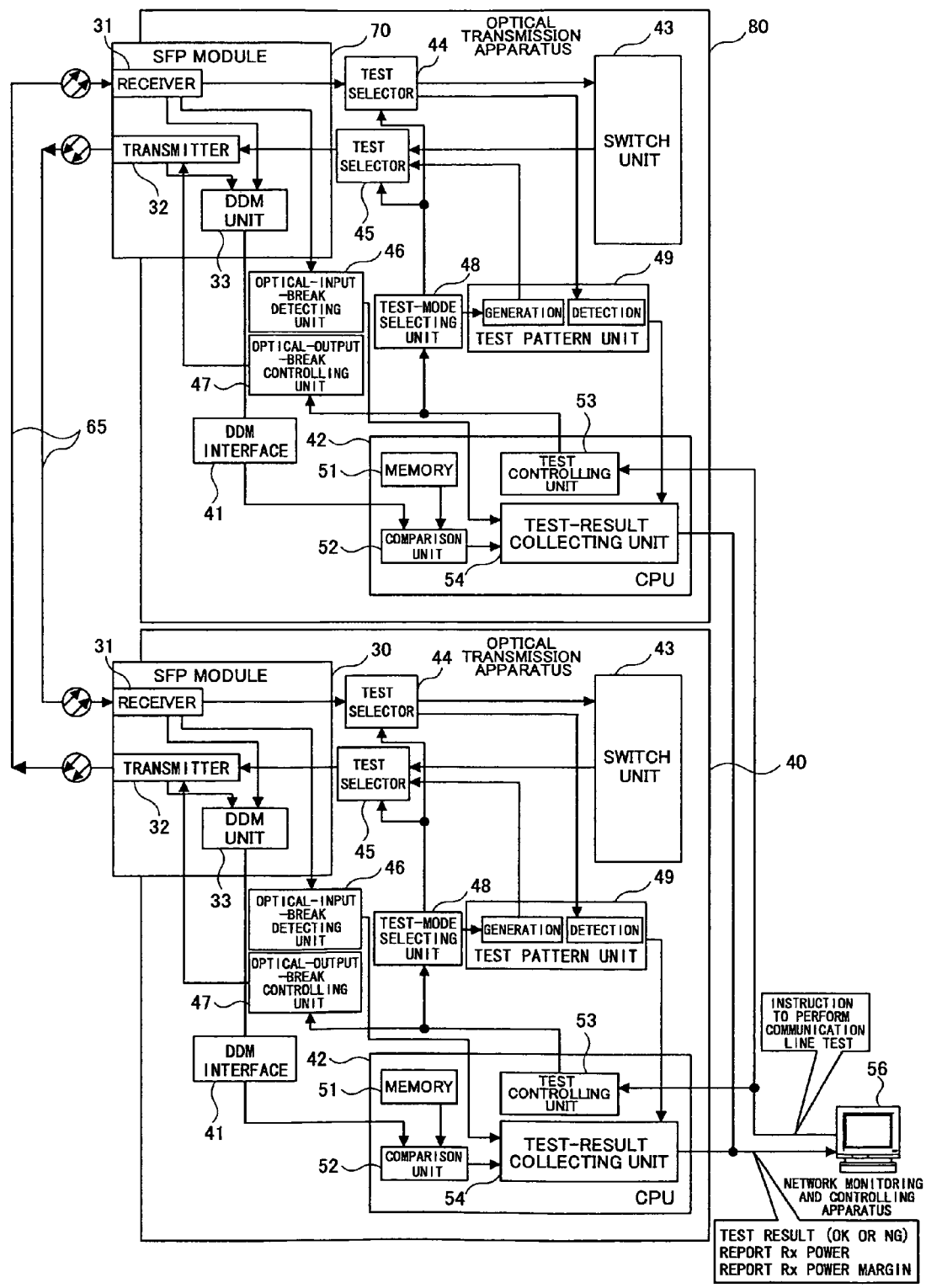
FIG. 6 is a drawing showing the configuration of an embodiment of a communication line test.

FIG. 6 is a drawing showing the configuration of an embodiment of a communication line test. For a communication line test, the optical transmission apparatus 40 is connected to a pluggable optical module 70 of a counterpart apparatus 80 via operating lines 65 that are actually used in practice, and performs a signal communication test and an optical-input-level check test.

The instruction to perform a communication line test is supplied from the network monitoring and controlling apparatus 56 to the optical transmission apparatus 40 and the optical transmission apparatus 80 that are connected to each other. In response to the instruction, the CPUs 42 of the optical transmission apparatuses 40 and 80 enter the signal communication test mode, so that the test selectors 44 and 45 of the optical transmission apparatuses 40 and 80 are switched from the operating communication line to the test pattern line, and the test pattern units 49 of the optical transmission apparatuses 40 and 80 supply a test pattern to the transmitters 32 of the pluggable optical modules 30 and 70, respectively. The test patterns are supplied through the operating lines 65 to the test pattern units 49 via the receivers 31 of the pluggable optical modules 70 and 30 of the optical transmission apparatuses 80 and 40, respectively.

The results of test pattern detection are reported to the CPUs 42 of the optical transmission apparatuses 80 and 40. In response, the system software of the CPU 42 of the optical transmission apparatus 40 or 80 reports the "signal communication test NG" to the network monitoring and controlling apparatus 56 if an error is found in the test pattern. If no error is detected in the test pattern, then, an input-level-check test mode is entered.

In the optical-input-level check test mode, the CPU 42 of each of the optical transmission apparatuses 40 and 80 reads the power of an optical input received by the receiver 31 via the DDM interface 41 from the DDM unit 33 of each of the pluggable optical modules 30 and 70, respectively. The optical reception power that is read in this manner is compared by the comparison unit 52 of the CPU 42 with the optical input standard level of the pluggable optical module 30 or 70 stored in the memory 51. If the optical input power is not within the optical input standard level, the system software of the CPU 42 reports an "optical-input-level check test NG" and the detected optical input power to the network monitoring and controlling apparatus 56. If the optical input power is within the optical input standard level, the system software of the CPU 42 reports to the network monitoring and controlling apparatus 56 a "communication test OK" and an indication of how much dB margin exists between the detected optical input power and the optical input standard level.

The communication test conducted in the manner as described above makes it possible for the communication carrier using the optical transmission apparatus to readily determine whether the pluggable optical module that does not satisfy the required specifications can be used in the operating line and also to readily determine the margin of the communication line. The number of process steps required for test preparation and test operation can thus be reduced, and installing a new pluggable optical module becomes easier.

Further, even if the pluggable optical module is not guaranteed by the apparatus maker, such pluggable optical module can be used in individual communication lines despite of some limitation. This widens the choices of pluggable optical modules so as to make it possible to use a less expensive optical module, thereby providing a cost advantage.

In this manner, the replacement of a pluggable optical module becomes easier, thereby allowing such replacement to be made locally and allowing an optical module different from the original one to be used as a replacement. This improves the ease of maintenance. Moreover, a communication line test is performed by use of operating communication lines, thereby making it possible to check the usability on a communication-line-specific basis independently of the guarantee provided by the apparatus maker. This widens the range of choices of pluggable optical modules, and thus allows the use of less expensive pluggable optical modules.

Further, a standalone test and real communication line test are performed to make it easier to perform a certification test with respect to a pluggable optical module. This helps to reduce the cost of introducing a new optical module and the period required for such introduction. Since the mechanism is provided to keep the certification rank table up to date at all times, the introduction of a state-of-the-art pluggable optical module becomes easier. Since the certification of pluggable optical modules is introduced, plugging-in and plugging-out can be freely made while preventing the use of a poor-quality product.

Further, the present invention is not limited to these embodiments, but various variations and modifications may be made without departing from the scope of the present invention.

The present application is based on Japanese priority application No. 2005-282095 filed on Sep. 28, 2005, with the Japanese Patent Office, the entire contents of which are hereby incorporated by reference.

What is claimed is:

1. An optical transmission apparatus to which an optical module having optical module information stored therein is attachable, the optical module information being manufacturing information about the optical module, comprising:
   a certification rank table configured to list, with respect to each of a plurality of optical modules, the optical module information regarding an optical module and a rank indicative of a range of guarantee for the corresponding optical module, the rank providing an indication of the corresponding optical module's quality rank in a ranking in which optical modules are arranged according to how likely the optical modules are to properly operate; and
   a ranking unit configured to search in the certification rank table for optical module information identical to the optical module information stored in an optical module attached to the optical transmission apparatus so as to retrieve, from the certification rank table, a rank associated with the optical module information found by the search, and to determine whether the optical module is usable,
   wherein the retrieved rank is reported to a network apparatus in exterior of the apparatus for checking of the rank and a determination of whether a test process is to be performed.

2. The optical transmission apparatus as claimed in claim 1, wherein the certification rank table is downloaded at constant intervals from a network monitoring and controlling apparatus.

3. The optical transmission apparatus as claimed in claim 1, further comprising a communication line test unit configured to perform a communication-line test by using an operating communication line with respect to the attached optical module according to the rank retrieved by the ranking unit.

4. The optical transmission apparatus as claimed in claim 3, further comprising a standalone test unit configured to perform a standalone test with respect to the attached optical module according to the rank retrieved by the ranking unit.

5. An optical transmission apparatus to which an optical module having optical module information stored therein is attachable, the optical module information being manufacturing information about the optical module, comprising:
   a certification rank table configured to list, with respect to each of a plurality of optical modules, the optical module information regarding an optical module and a rank indicative of a range of guarantee for the corresponding optical module;
   a ranking unit configured to refer to the certification rank table by use of the optical module information stored in an optical module attached to the optical transmission apparatus so as to determine the rank indicative of a range of guarantee for the attached optical module, wherein the determined rank is reported to an exterior of the apparatus;
   a communication line test unit configured to perform a communication-line test by using an operating communication line with respect to the attached optical module according to the rank determined by the ranking unit; and
   a standalone test unit configured to perform a standalone test with respect to the attached optical module according to the rank determined by the ranking unit,
   wherein the certification rank table has a table size thereof varying depending on a position of the apparatus in a network.

* * * * *